United States Patent [19]

Jason

[11] 4,221,152
[45] Sep. 9, 1980

[54] TWO PIECE FASTENER INCLUDING A PIN WITH UNDERCUT PINTAIL

[75] Inventor: Harold C. Jason, Carson, Calif.

[73] Assignee: Huck Manufacturing Company, Detroit, Mich.

[21] Appl. No.: 942,029

[22] Filed: Sep. 13, 1978

[51] Int. Cl.² .......................................... F16B 19/05
[52] U.S. Cl. ............................................................ 85/7
[58] Field of Search ............... 85/7, 5 R, 77, 78, 70, 85/71, 72; 72/90, 88

[56] References Cited

U.S. PATENT DOCUMENTS

| 2,372,222 | 3/1945 | Mullgardt | 85/78 |
| 2,384,037 | 9/1945 | Kugler | 72/449 |
| 2,405,897 | 8/1946 | Milone et al. | 85/37 |
| 2,428,165 | 9/1947 | Ketchum | 85/78 X |
| 2,803,984 | 8/1957 | Swenson | 85/70 X |
| 3,044,332 | 7/1962 | Siebol | 72/88 X |
| 3,178,989 | 4/1965 | Siebol | 85/71 |
| 3,215,024 | 11/1965 | Brilmyer et al. | 85/7 |
| 3,425,259 | 2/1969 | Baugh | 85/7 UX |
| 3,460,429 | 8/1969 | La Torre | 85/78 |
| 3,483,788 | 12/1969 | Keeler | 85/7 |
| 3,880,042 | 4/1975 | Binns | 85/77 X |

FOREIGN PATENT DOCUMENTS 351802 3/1961 Switzerland .................................. 85/7

*Primary Examiner*—Ramon S. Britts
*Attorney, Agent, or Firm*—Harness, Dickey & Pierce

[57] ABSTRACT

A two part fastener of the lockbolt type is provided in which the pintail portion is provided with a rollback type land immediately adjacent the breakneck groove having a diameter generally no greater than the root diameter of the pull grooves provided thereon. This reduced diameter rollback type land prevents the separated pintail from interfering with operation of the tool jaws during setting of a subsequent fastener so as to enable the length of the pintail to be reduced to a minimum thereby reducing the cost of materials while enabling use of conventional installation tools.

9 Claims, 4 Drawing Figures

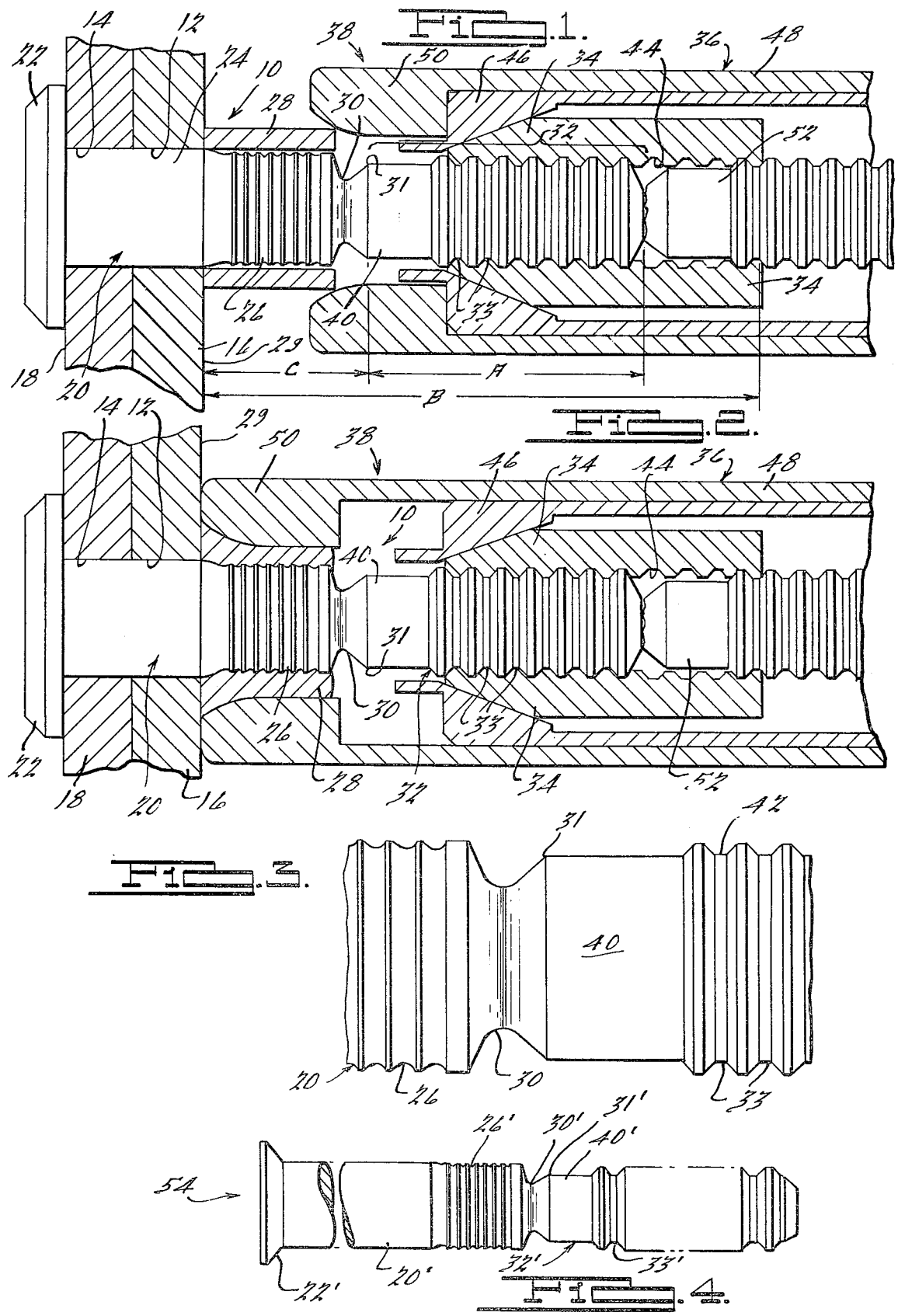

TWO PIECE FASTENER INCLUDING A PIN WITH UNDERCUT PINTAIL

BACKGROUND AND SUMMARY OF THE INVENTION

The present invention relates generally to fasteners and more particularly to two part fasteners of the type comprising a headed pin adapted to have a collar swaged thereon by action of a pulling tool gripping grooves on a minimum length pintail portion of the pin and more especially a pin constructed of an exotic material such as a titanium alloy or the like, and having a pintail portion of minimum length.

Two part fasteners employing a headed pin which are adapted to have a collar swaged to a shank portion thereof by means of a pulling tool gripping pull grooves in a pintail portion of the pin are well known in the art. Typically, such pins are provided with an elongated shank on which are provided successively from the head axially outwardly a plurality of lock grooves into which the collar is swaged, a breakneck groove, and a pintail portion having a plurality of pulling grooves. These fasteners are designed to be set by a pulling tool engaging the pulling grooves so as to exert an axial tension on the pin to secure a plurality of workpieces together and thereafter cause an anvil provided on the tool to swage the collar into locking engagement with the lock grooves. Thereafter, the breakneck groove operates to enable the tool to separate the pintail from the set fastener. In tools conventionally used in setting these fasteners, the severed pintail is not ejected forwardly therefrom but rather is moved axially through the tool jaws by the pintail of the next fastener to be set and is ejected to the rear of the tool. It is a common practice to form various ones of the grooves in the pin by rolling. In the process of rolling the metal displaced to form grooves is moved to define crests; normally then a pin blank of nominal diameter, i.e. between the crest and root diameter is used. Thus when the grooves are rolled a land of nominal diameter remains. With some materials the breakneck groove is rolled providing a rollback land of a diameter approximating the diameter of the crest of the pull grooves and/or locking grooves. With titanium alloys it is a practice not to roll the breakneck groove but to machine the same. Whether the breakneck groove is formed by rolling and an increased diameter rollback land is formed or the breakneck groove is machined from a blank (rolled to form locking and pull grooves) of a nominal diameter, the rollback land (or area adjacent the breakneck groove) poses a problem in minimizing the length of the pintail portion. Thus conventional pintails have a smooth shank portion or rollback land immediately adjacent the breakneck groove which is of a diameter equal to or greater than the nominal diameter of the pull grooves. With such a construction, it has been necessary to provide a sufficiently long pintail to insure that the previously separated pintail completely clears the jaws of the tool since the rollback (or nominal diameter) land if located in the jaws will hold them open and prevent gripping or full gripping of the next fastener. Since the severed pintail is discarded, this extra length requirement results in needless extra cost of materials for the fastener which costs become quite significant in such fasteners fabricated from exotic metals such as titanium alloys of the like.

Accordingly, the present invention provides a fastener in which the diameter of the smooth shank portion or rollback land of the pintail is reduced to be no greater than the root diameter of the pull grooves. This thereby enables the jaws of the pulling tool to fully engage the pull grooves of the next fastener to be set without regard to whether the previously separated pintail has fully cleared the jaws or not. This diameter reduction allows substantial cost savings to be realized in reduced material requirements as the pintails need be only long enough to accommodate the minimum number of pull grooves required for the particular type fastener while still enabling the fastener to be installed with conventional tools presently in use.

Additional advantages and features of the present invention will become apparent from the subsequent description and the appended claims taken in conjunction with the accompanying drawings.

BRIEF DESCRIPTION OF THE DRAWINGS

FIG. 1 is a view of a two part fastener, comprising a pin and a collar with the collar shown in section, and with the fastener constructed in accordance with the present invention and shown in operative relationship with a fragmentary view of a conventional tool, partially shown in section;

FIG. 2 is a view similar to FIG. 1 but showing the collar in a swaged condition;

FIG. 3 is an enlarged fragmentary view of a portion of the fastener pin of FIGS. 1 and 2; and FIG. 4 is a view of another embodiment of a fastener pin in accordance with the present invention.

DESCRIPTION OF THE PREFERRED EMBODIMENT

Referring now to the drawings, a two part fastener indicated generally at 10 and constructed in accordance with the present invention comprises a pin 20 and a collar member 28. Fastener 10 is shown with the pin 20 having an elongated shank portion 24 extending through aligned openings 12 and 14 of workpieces 16 and 18, and having an enlarged head 22 at one end thereof adapted to engage the outer surface of workpiece 18.

Shank portion 24 has a plurality of annular lock grooves 26 located from the 22 a preselected distance such that when pin 20 is located in openings 12 and 14, the lock grooves 26 will be disposed adjacent to and outward from opening 12. The lock grooves are of a known construction and are adapted to have collar member 28 swaged into locking engagement therewith. A reduced diameter breakneck groove 30 is disposed adjacent to the lock grooves 26 such that when the collar member 28 is located on the shank 24 of the pin 20 the breakneck groove 30 will be located proximate to the axially outer end of collar member 28. Shank 24 also includes a pintail portion 32 located at the end of shank 24 opposite the head 22; the pintail portion 32 is provided with a plurality of pull grooves 33 extending towards the breakneck groove 30 and adapted to be engaged by a plurality of jaws 34 of tool 38.

A relatively smooth nominal diameter portion or rollback land 40 is disposed on pintail portion 32 having a juncture point 31 at breakneck groove 30 and extending axially to pull grooves 33. As noted, it is conventional practice to form the locking grooves 26 and pull grooves 33 by rolling dies. In such forming a blank of nominal diameter, i.e. between the diameter of the crests and roots of the grooves 26 and 33 is employed and the crests of grooves 26 and 33 are formed by material displaced in the formation of the grooves. In some structures, the breakneck groove 30 is rolled and the displaced material forms a land (in the location of land 40) having a diameter greater than the root diameter of the pull grooves 33 and approximately the diameter of the crests thereof. In other cases the breakneck groove 30 is machined and the material in the location of the land 40 would be at the nominal diameter of the pin blank. In the present invention, however, the diameter of rollback land portion 40 is reduced to be no greater than the diameter of the root portion 42 of the pull grooves. This reduced diameter rollback land may be fabricated in any conventional manner such as by a machining or milling operation for example.

The fastener of the present invention is preferably designed for use with an installation tool having a non self releasing nose assembly generally of the type shown and described in U.S. Pat. No. 2,527,307 to L. C. Huck issued Oct. 24, 1950. Thus the tool 38 is of conventional construction having a non self releasing nose assembly 36 including jaws 34 of a known self actuating and non self releasing construction. Jaws 34 are typically provided with 8 to 10 teeth 44 and are movably disposed within a collet or jaw retracting member 46 which is designed to reciprocate within a housing 48. The housing 48 has a swaging anvil 50 disposed at the outer end thereof. Biasing means (not shown, see patent to L. C. Huck, supra) continuously urge jaws 34 axially outwardly with respect to housing 48 and radially inwardly towards a closed condition.

To set fastener 10, the pin 20 is inserted through openings 12 and 14 and collar member 28 placed over shank portion 24. The pintail portion 32 is inserted into the open end of tool 38 causing jaws 34 to initially move axially rearwardly (against the bias means) and radially outwardly and, in a sense, to ratchet on the pull grooves 33 whereby the teeth 44 when the jaws 34 close will automatically grip the pull grooves 33. This continuous biasing force, however, prevents tool 38 from being removed from pintail 32 until the fastener is set. The collet 46 is then caused to move axially rearwardly relative to anvil portion 50 moving the jaws 34 rearwardly thereby tensioning pin 20 and causing anvil 50 to swage collar member 28 into engagement with lock grooves 26 (see FIG. 2). Thereafter, continued axially rearward movement of collet 46 will increase the tension on pin 20 until pintail portion 32 is severed from the set fastener at the breakneck groove 30. As tool 38 is applied to the next fastener to be set, pintail portion 32 will be moved into engagement with jaws 34 and the previously severed pintail portion thereby causing the previously severed pintail portion, indicated at 52 in the drawings, to be moved axially rearwardly relative to the tool 38 through the plurality of jaws 34 for ultimate ejection. In order to reduce the material of the pintail 32 in the present invention it is preferably fabricated with a minimum number of pull grooves which are required to enable it to carry sufficient axial force for setting the fastener 10. However, with conventional jaws 34, of the non self releasing type, having a predetermined, established axial length, the pintail 32 is too short to be able to fully clear the previously severed pintail 52 from the jaw area. With prior constructions this would preclude the use of a shortened pintail since the rollback type land (in the position of land 40) would engage the teeth 44 of jaws 34 preventing them from closing fully on the pull grooves of the next fastener to be set. This problem has been overcome with the present invention since now the diameter of rollback type land portion 40 of the rolled pin 20 has been reduced to a dimension substantially equal to the root diameter of the pull grooves 33. Thus any interference with the engagement of jaws 34 with pull grooves 33 of pintail 32 by a preceding rollback land is eliminated. Note that even if the land portion of the severed pintail is of the nominal diameter permitting partial engagement of the teeth 44 of jaws 34 with the pull grooves of the next fastener, since a minimum number of pull grooves only can be provided on the reduced length pintail, the partial engagement between jaw teeth and pull grooves would not be sufficient to permit application of the necessary tensile or axial force to the pull grooves for setting the fastener. Of course, where the rollback land was of the crest diameter of the pull grooves even partial engagement would be precluded.

While the present invention is illustrated and described with reference to FIGS. 1-3 which illustrate a fastener having a pin with a protruding head 22, it may also be incorporated with a fastener 54 having a pin with flush head. Thus in FIG. 4 components similar to like components in FIGS. 1-3 have been indicated by like numerals primed. The flush head fastener 54 operates in substantially an identical manner as described above. It should be noted, however, that with regard to both the protruding head and flush head embodiments described above, they may be of either the tension type or shear type fasteners, the diffenece therebetween being primarily in the actual dimensions of the head and the setting force required to be applied thereto.

Thus, by reducing the diameter of the rollback land it is possible to reduce the number of pull grooves to a minimum and hence to reduce the overall length of the pintail while still enabling conventional installation tools to be used for setting the fastener. The ability to use a conventional installation tool of the non self releasing nose assembly type is an important consideration in the design and fabrication of a fastener since such tools can then be used for fasteners of different types without modification, and further such tools additionally permit the use of a minimum length pintail. Further, as the pintail portion of the pin 20 does not contribute to the strength of the set fastener, it is very desirable to reduce the cost attributable to this scrap portion; this is particularly significant for fasteners fabricated from expensive, exotic metals such as titanium alloys or the like. The following table indicates the preferred minimum number of pull grooves required for selected pin diameters and the actual number of teeth conventionally provided on the installation tool jaws;

| Fastener Dia. (inches) | Min. No. of Pull Grooves | | Total Teeth in Tool Jaws |
| --- | --- | --- | --- |
| | Shear | Tension | |
| 3/16 | 6 | 6 | 10 |
| ¼ | 6 | 7 | 8 |
| 5/16 | 5 | 6 | 9 |
| ⅜ | 6 | 8 | 9 |

The maximum length pintail contemplated by the present invention may be defined by the following formula: $A \leq B - C$, (see FIG. 1), wherein A is the length of the pintail 32 measured approximately from the juncture 33 to the terminal end thereof, B is the distance from the sheet line 29 of workpiece 16 to the most distant tooth of jaws 34 and C is the distance from the sheet line 29 of workpiece 16 approximately to juncture 33. In conventional two piece fasteners of this type the pintail length A would have to be greater than the difference between dimensions B and C in order to insure that the pintail would be sufficiently long to fully, axially clear the previously separated pintail from the jaw area. Note that the amount of material remaining on the severed pintail portion from the associated breakneck groove has been disregarded since that dimension can vary from fastener to fastener.

With many fasteners a gap exists between workpieces and it is the fastener which effectuates the pull together of the workpieces. In the present invention, it is preferred that the workpieces are clamped and hence little or no pull together is required of the fastener whereby the minimum number of pull grooves, and hence minimum length of pintail portion, can be accurately determined.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

What is claimed is:

1. A two part fastener for securing a plurality of workpieces together comprising a pin member and a collar member, said pin member being made of an exotic material such as titanium alloy and having an elongated shank portion terminating on one end in an enlarged head, said shank portion having a plurality of lock grooves, a pintail portion and a breakneck groove between said lock grooves and said pintail portion, said pintail portion having a plurality of pulling grooves and a rollback land disposed between and immediately adjacent each of said breakneck groove and said pulling grooves, said collar member being adapted to be located on said shank portion in surrounding relationship with said lock grooves and adapted to be swaged into engagement with said lock grooves by action of a pulling tool, the pulling tool having multitooth jaw means for engaging said pulling grooves and an anvil for engaging and swaging said collar, said jaw means being of a non-self-releasing structure and being actuable from a forwardmost position in which it engages said pulling grooves to a readwardmost position, said collar being swaged by said anvil in response to relative movement of said jaw means from said forwardmost position toward said rearwardmost position, and said pulling tool being further operative in said relative movement to separate said pintail portion from said shank portion at said breakneck groove subsequent to said collar being swaged, said severed pintail being moved at least partially axially through said jaw means in response to application of said jaw means to a pin member of a subsequent fastener and by engagement of its severed end with the shank portion of such pin member of said subsequent fastener, said rollback land having a diameter generally no greater than the root diameter of said pulling grooves and wherein said pintail portion has a maximum length generally defined by the formula $A \leq B - C$ wherein A is the length of said pintail portion measured from the terminal end thereof to approximately the juncture point between said breakneck groove and said rollback land, B is the distance from the collar engaging sheet line of said workpieces to the most distant pintail engaging portion of said jaw means when said jaw means are in said forwardmost position and said anvil is in initial engagement with said collar member and C is the distance from the collar engaging sheet line to approximately the juncture point between said breakneck groove and said rollback land.

2. A fastener as set forth in claim 1 wherein the number of pull grooves provided on said pintail portion is no greater than the minimum number of pull grooves required to be engaged by said tool to set said fastener and is less than the number of teeth on said jaw means.

3. A two part fastener for securing a plurality of workpieces together which workpieces are located in close engagement with each other whereby the need for pull together of the workpieces during setting is minimized, said two part fastener comprising a pin member and a collar member, said pin member having an elongated shank portion terminating on one end in an enlarged head, said shank portion having a plurality of lock grooves, a pintail portion and a breakneck groove between said lock grooves and said pintail portion, said pintail portion being of a preselected minimum length and having a plurality of pulling grooves and a rollback land disposed between and immediately adjacent each of said breakneck groove and said pulling grooves, said pin member being formed from a pin blank with at least some of said lock grooves, pulling grooves and breakneck groove being formed by rolling from a nominal diameter which is intermediate the diameter of the crests and roots of the rolled grooves and with said rollback land initially having a diameter greater than the diameter of the roots of said pulling grooves, said collar member adapted to be located on said shank portion in surrounding relationship with said lock grooves and adapted to be swaged into engagement with said lock grooves by action of a pulling tool, the pulling tool having multitooth jaw means for engaging said pulling grooves and an anvil for engaging and swaging said collar, said jaw means being of a non-self-releasing structure and being actuable from a fowardmost position in which it engages said lock grooves to a rearwardmost position, said collar being swaged by said anvil in response to relative movement of said jaw means from said forwardmost position toward said rearwardmost position, and said pulling tool being further operative in said relative movement to separate said pintail portion from said shank portion at said breakneck groove subsequent to said collar being swaged, said severed pintail being moved at least partially axially through said jaw means in response to application of said jaw means to a pin member of a subsequent fastener and by engagement of its severed end with the shank portion of such pin member of said subsequent fastener, said rollback land having a diameter generally no greater than the root diameter of said pulling grooves, said minimum length of said pintail portion being selected such that the terminal end of said pintail portion extends only partially axially through the toothed portion of said jaw means when said jaw means are in said forwardmost position and said anvil is in initial engagement with said collar member whereby said minimum length of said pintail portion is insufficient to move said severed pintail completely axially through said jaw means.

4. A two part fastener for securing a plurality of workpieces together which workpieces are located in close engagement with each other whereby the need for pull together of the workpieces by said fastener during setting is minimized, said two part fastener comprising a pin member and a collar member, said pin member being made of an exotic material such as titanium alloy and having an elongated shank portion terminating on one end in an enlarged head, said shank portion having a plurality of lock grooves, a pintail portion and a breakneck groove between said lock grooves and said pintail portion, said pintail portion being of a preselected minimum length and having a plurality of pulling grooves and a rollback land disposed between and immediately adjacent each of said breakneck groove and said pulling grooves, said pin member being formed from a pin blank with at least some of said lock grooves, pulling grooves and breakneck groove being formed by rolling from a nominal diameter which is intermediate the diameter of the crests and roots of the rolled grooves and with said rollback land initially having a diameter greater than the diameter of the roots of said pulling grooves said collar member adapted to be located on said shank portion in surrounding relationship with said lock grooves and adapted to be swaged into engagement with said lock grooves by action of a pulling tool, the pulling tool having multitooth jaw means for engaging said pulling grooves and an anvil for engaging and swaging said collar, said jaw means being of a non-self-releasing structure and being actuable from a forwardmost position in which it engages said lock grooves to a rearwardmost position, said collar being swaged by said anvil in response to relative movement of said jaw means from said forwardmost position toward said rearwardmost position, and said pulling tool being further operative in said relative movement to separate said pintail portion from said shank portion at said breakneck groove subsequent to said collar being swaged, said severed pintail being moved at least partially axially through said jaw means in response to application of said jaw means to a pin member to a subsequent fastener and by engagement of its severed end with the shank portion of such pin member of said subsequent fastener, said rollback land having its diameter reduced generally to no greater than the root diameter of said pulling grooves and wherein said pintail portion has a maximum length generally defined by the formula $A \leq B - C$ wherein A is the length of said pintail portion measured from the terminal end thereof to approximately the juncture point between said breakneck groove and said rollback land, B is the distance from the collar engaging sheet line of said workpieces to the most distant pintail engaging portion of said jaw means when said jaw means are in said forwardmost position and said anvil is in initial engagement with said collar member and C is the distance from the collar engaging sheet line to approximately the juncture point between said breakneck groove and said rollback land.

5. A two part fastener for securing a plurality of workpieces together which workpieces are located in close engagement with each other whereby the need for pull together of the workpieces by said fastener during setting is minimized, said two part fastener comprising a pin member and a collar member, said pin member being made of an exotic material such as titanium alloy and having an elongated shank portion terminating on one end in an enlarged head, said shank portion having a plurality of lock grooves, a pintail portion and a breakneck groove between said lock grooves and said pintail portion, said pintail portion being of a preselected minimum length and having a plurality of pulling grooves and a rollback land disposed between and immediately adjacent each of said breakneck groove and said pulling grooves, said pin member being formed from a pin blank with at least some of said lock grooves, pulling grooves and breakneck groove being formed by rolling from a nominal diameter which is intermediate the diameter of the crests and roots of the rolled grooves and with said rollback land initially having a diameter greater than the diameter of the roots of said pulling grooves, said collar member adapted to be located on said shank portion in surrounding relationship with said lock grooves and adapted to be swaged into engagement with said lock grooves by action of a pulling tool, the pulling tool having multitooth jaw means for engaging said pulling grooves and an anvil for engaging and swaging said collar, said jaw means being of a non-self-releasing structure and being actuable from a forwardmost position in which it engages said lock grooves to a rearwardmost position, said collar being swaged by said anvil in response to relative movement of said jaw means from said fowardmost position toward said rearwardmost position, said pulling tool being further operative in said relative movement to separate said pintail portion from said shank portion at said breakneck groove subsequent to said collar being swaged, said severed pintail being moved at least partially axially through said jaw means in response to application of said jaw means to a pin member of a subsequent fastener and by engagement of its severed end with the shank portion of such pin member of said subsequent fastener, said shank portion having a minimum number of pulling grooves which in sizes of said pin member from 3/16" diameter to ⅜" diameter for a shear type of said fastener will be no greater than six and no less than five in number with said number being less than the number of teeth on said jaw means, said rollback land having its diameter reduced generally to no greater than the root diameter of said pulling grooves and wherein said pintail portion has a maximum length generally defined by the formula $A \leq B - C$ wherein A is the length of said pintail portion measured from the terminal end thereof to approximately the juncture point between said breakneck groove and said rollback land, B is the distance from the collar engaging sheet line of said workpieces to the most distant pintail engaging portion of said jaw means when said jaw means are in said forwardmost position and said anvil is in initial engagment with said collar member and C is the distance from the collar engaging sheet line to approximately the juncture point between said breakneck groove and said rollback land.

6. A two part fastener for securing a plurality of workpieces together which workpieces are located in close engagement with each other whereby the need for pull together of the workpieces by said fastener during setting is minimized, said two part fastener comprising a pin member and a collar member, said pin member being made of an exotic material such as titanium alloy and having an elongated shank portion terminating on one end in an enlarged head, said shank portion having a plurality of lock grooves, a pintail portion and a breakneck groove between said lock grooves and said pintail portion, said pintail portion being of a preselected minimum length and having a plurality of pulling grooves and a rollback land disposed between and immediately adjacent each of said breakneck grooves and said pulling grooves, said pin member being formed from a pin blank with at least some of said lock grooves, pulling grooves and breakneck groove being formed by rolling from a nominal diameter which is intermediate the diameter of the crests and roots of the rolled grooves and with said rollback land initially having a diameter greater than the diameter of the roots of said pulling grooves, said collar member adapted to be located on said shank portion in surrounding relationship with said lock grooves and adapted to be swaged into engagement with said lock grooves by action of a pulling tool, the pulling tool having multitooth jaw means for engaging said pulling grooves and an anvil for engaging and swaging said collar, said jaw means being of a non-self-releasing structure and being actuable from a forwardmost position in which it engages said lock grooves to a rearwardmost position, said collar being swaged by said anvil in response to relative movement of said jaw means from said forwardmost position toward said rearwardmost position, and said pulling tool being further operative in said relative movement to separate said pintail portion from said shank portion at said breakneck groove subsequent to said collar being swaged, said severed pintail being moved at least partially axially through said jaw means in response to application of said jaw means to a pin member of a subsequent fastener and by engagement of its severed end with the shank portion of such pin member of said subsequent fastener, said shank portion having a minimum number of pulling grooves which in sizes of said pin member from 3/16" diameter to ⅜" diameter for a tension type of said fastener will be no greater than eight and no less than six in number with said number being less than the number of teeth on said jaw means, said rollback land having its diameter reduced generally to no greater than the root diameter of said pulling grooves and wherein said pintail portion has a maximum length generally defined by the formula $A \leq B - C$ wherein A is the length of said pintail portion measured from the terminal end thereof to approximately the juncture point between said breakneck groove and said rollback land, B is the distance from the collar engaging sheet line of said workpieces to the most distant pintail engaging portion of said jaw means when said jaw means are in said forwardmost position and said anvil is in initial engagement with said collar member and C is the distance from the collar engaging sheet line to approximately the juncture point between said breakneck groove and said rollback land.

7. A two part fastener for securing a plurality of workpieces together which workpieces are located in close engagement with each other whereby the need for pull together of the workpieces during setting is minimized, said two part fastener comprising a pin member and a collar member, said pin member having an elongated shank portion terminating on one end in an enlarged head, said shank portion having a plurality of lock grooves, a pintail portion and a breakneck groove between said lock grooves and said pintail portion, said pintail portion being of a preselected minimum length and having a plurality of pulling grooves and a rollback land disposed between and immediately adjacent each of said breakneck groove and said pulling grooves, said pin member being formed from a pin blank with at least some of said lock grooves, pulling grooves and breakneck groove being formed by rolling from a nominal diameter which is intermediate the diameter of the crests and roots of the rolled grooves with said rollback land initially having a diameter greater than the diameter of the roots of said pulling grooves, said collar member adapted to be located on said shank portion in surrounding relationship with said lock grooves and adapted to be swaged into engagement with said lock grooves by action of a pulling tool, the pulling tool having multitooth jaw means for engaging said pulling grooves and an anvil for engaging and swaging said collar, said jaw means being of a non-self-releasing structure and being actuable from a forwardmost position in which it engages said lock grooves to a rearwardmost position, said collar being swaged by said anvil in response to relative movement of said jaw means from said forwardmost position toward said rearwardmost position, and said pulling tool being further operative in said relative movement to separate said pintail portion from said shank portion at said breakneck groove subsequent to said collar being swaged, said severed pintail being moved at least partially axially through said jaw means in response to application of said jaw means to a pin member of a subsequent fastener and by engagement of its severed end with the shank portion of such pin member of said subsequent fastener, said rollback land having a diameter generally no greater than the root diameter of said pulling grooves, said shank portion having a minimum number of pulling grooves which in sizes of said pin member from 3/16" diameter to ⅜" diameter for a shear type of said fastener will be no greater than six and no less than five in number with said number being less than the number of teeth on said jaw means, and said minimum length of said pintail being selected so that the outermost tooth of said jaw means engages the pulling groove immediately adjacent said rollback land when said jaw means is in said forwardmost position.

8. A two part fastener for securing a plurality of workpieces together which workpieces are located in close engagement with each other whereby the need for pull together of the workpieces during setting is minimized, said two part fastener comprising a pin member and a collar member, said pin member having an elongated shank portion terminating on one end in an enlarged head, said shank portion having a plurality of lock grooves, a pintail portion and a breakneck groove between said lock grooves and said pintail portion, said pintail portion being of a preselected minimum length and having a plurality of pulling grooves and a rollback land disposed between and immediately adjacent each of said breakneck groove and said pulling grooves, said pin member being formed from a pin blank with at least some of said lock grooves, pulling grooves and breakneck groove being formed by rolling from a nominal diameter which is intermediate the diameter of the crests and roots of the rolled grooves and with said rollback land initially having a diameter greater than the diameter of the roots of said pulling grooves, said collar member adapted to be located on said shank portion is surrounding relationship with said lock grooves and adapted to be swaged into engagement with said lock grooves by action of a pulling tool, the pulling tool having multitooth jaw means for engaging said pulling grooves and an anvil for engaging and swaging said collar, said jaw means being of a non-self-releasing structure and being actuable from a forwardmost position in which it engages said lock grooves to a rearwardmost position, said collar being swaged by said anvil in response to relative movement of said jaw means from said forwardmost position toward said rearwardmost position, and said pulling tool being further operative in said relative movement to separate said pintail portion from said shank portion at said breakneck groove subsequent to said collar being swaged, said severed pintail being moved at least partially axially through said jaw means in response to application of said jaw means to a pin member of a subsequent fastener and by engagement of its severed end with the shank portion of such pin member of said subsequent fastener, said rollback land having a diameter generally no greater than the root diameter of said pulling grooves, said shank portion having a minimum number of pulling grooves which in sizes of said pin member from 3/16" diameter to ⅜" diameter for a tension type of said fastener will be no greater than eight and no less than six in number with said number being less than the number of teeth on said jaw means, and said minimum length of said pintail being selected so that the outermost tooth of said jaw means engages the pulling groove immediately adjacent said rollback land when said jaw means is in said forwardmost position.

9. A two part fastener for securing a plurality of workpieces together which workpieces are located in close proximity with each other whereby the need for pull together of the workpieces during setting is minimized, comprising a one piece pin member and a collar member, said pin member having an elongated shank portion terminating at one end in an enlarged head, said shank portion having a plurality of lock grooves, a pintail portion and a breakneck groove between said lock grooves and said pintail portion, said pintail portion having a plurality of pulling grooves and a rollback land disposed between and immediately adjacent each of said breakneck groove and said pulling grooves, said pin member being formed from a pin blank with at least some of said lock grooves, pulling grooves and breakneck groove being formed by rolling from a nominal diameter which is intermediate the diameter of the crests and roots of the rolled grooves and with said rollback land initially having a diameter greater than the diameter of the roots of said pulling grooves, said collar member adapted to be located on said shank portion in surrounding relationship with said lock grooves and adapted to be swaged into engagement with said lock grooves by action of a pulling tool, the pulling tool having jaw means including a multitoothed portion for engaging said pulling grooves and an anvil for engaging and swaging said collar, said jaw means being of a non-self-releasing structure and being actuable from a forwardmost position in which it engages said pulling grooves to a rearwardmost position, said collar being swaged by said anvil in response to relative movement of said jaw means from said forwardmost position toward said rearwardmost position, and said pulling tool being further operative in said relative movement to separate said pintail portion from said shank portion at said breakneck groove subsequent to said collar being swaged and thereby resulting in a severed pintail which is retained within said toothed portion, said rollback land in the area of confrontation with the teeth of said jaw portion having a diameter generally no greater than the root diameter of said pulling grooves and wherein said pintail portion prior to setting of said fastener has a minimum length selected such that the terminal end of said pintail portion extends only partially axially through said toothed portion of said jaw means when said jaw means are in said fowardmost position and said anvil is in initial engagement with said collar member whereby said minimum length of said pintail portion is insufficient to move said severed pintail completely axially through said jaw means and said toothed portion can engage said pulling grooves and said pintail portion while still retaining said severed pintail.

* * * * *